United States Patent
Sayers et al.

(10) Patent No.: US 11,137,837 B2
(45) Date of Patent: Oct. 5, 2021

(54) INPUT DEVICE WITH PRECISION CONTROL

(71) Applicant: Hewlett-Packard Development Company, L.P., Spring, TX (US)

(72) Inventors: Craig Peter Sayers, Palo Alto, CA (US); Ian N Robinson, Palo Alto, CA (US); Hiroshi Horii, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/618,437

(22) PCT Filed: Oct. 23, 2017

(86) PCT No.: PCT/US2017/057846
§ 371 (c)(1),
(2) Date: Dec. 2, 2019

(87) PCT Pub. No.: WO2019/083495
PCT Pub. Date: May 2, 2019

(65) Prior Publication Data
US 2020/0241659 A1 Jul. 30, 2020

(51) Int. Cl.
*G06F 3/033* (2013.01)
*G06F 3/0354* (2013.01)

(52) U.S. Cl.
CPC .................. *G06F 3/03543* (2013.01)

(58) Field of Classification Search
None
See application file for complete search history.

(56) References Cited

U.S. PATENT DOCUMENTS

| 4,891,632 | A | 1/1990 | Chang |
| 7,545,362 | B2 | 6/2009 | Kong |
| 7,557,797 | B2 | 7/2009 | Ludwig |
| 8,310,446 | B1 | 11/2012 | Owen |
| 2002/0171625 | A1 | 11/2002 | Rothchild |
| 2004/0017355 | A1 | 1/2004 | Shim |
| 2004/0259638 | A1 | 12/2004 | Kramer et al. |

(Continued)

FOREIGN PATENT DOCUMENTS

CN   1320428 C   6/2005

OTHER PUBLICATIONS

Indiegogo, The Z: Gamer, Designer Mouse with Pivot Tilt & Roll, https://www.indiegogo.com/projects/the-z-gamer-designer-mouse-with-pivot-tilt-roll-com, 10 pages, Oct. 7, 2017.

(Continued)

*Primary Examiner* — Adam R. Giesy
(74) *Attorney, Agent, or Firm* — HP Inc. Patent Department

(57) ABSTRACT

An input device includes a sensor and a housing. The sensor is adapted to provide cursor control on a display based on relative movement between the sensor and a reference surface. The housing at least partially contains the sensor and is adapted to be selectively manipulable relative to the reference surface into a first position to cause operation of the sensor at a first precision level and into a second position to cause operation of the sensor at a second precision level different from the first precision level.

16 Claims, 9 Drawing Sheets

(56) References Cited

U.S. PATENT DOCUMENTS

| | | |
|---|---|---|
| 2006/0250353 A1 | 11/2006 | Yasutake |
| 2010/0066670 A1 | 3/2010 | Amm et al. |
| 2010/0127983 A1 | 5/2010 | Irani et al. |
| 2010/0315336 A1* | 12/2010 | Butler ............... G06F 3/017 345/158 |
| 2012/0256837 A1 | 10/2012 | Chang et al. |
| 2015/0193023 A1* | 7/2015 | Odgers ............ G06F 3/017 345/163 |
| 2015/0332036 A1 | 11/2015 | Breedvelt-Schouten et al. |
| 2016/0004224 A1 | 1/2016 | Pi |
| 2018/0275778 A1* | 9/2018 | Zhang ............ G06F 3/0317 |

OTHER PUBLICATIONS

Lazee Tek, eeZee_Mouse adapted mice provide people with disabilities reliable computer access, http://www.lazeetek.com/html/eezee_mouse.html, Oct. 7, 2017, 3 pages.

Tilt Mouse, TiltMouse, http://www.tiltmouse.com/documents.htm, 5 pages.

Frohlich, B. et al. The Cubic Mouse A New Device for Three-Dimensional Input, Proceedings ACM CHI 2000, pp. 526-531, Apr. 2000, abstract, chapter "introduction" [online] [retrieved on Jun. 9, 2018] Retrieved from the Internet: <URL: http://citeseerx.ist.psu.edu/viewdoc/download?doi=10.1.1.84.6127&rep=rep1&type=pdf>.

Murphy, David "The Best Gaming Mouse" Posted Jul. 5, 2017 [online] [retrieved on Aug. 16, 2017], Available at: <http://thewirecutter.com/reviews/best-gaming-mouse/>.

* cited by examiner

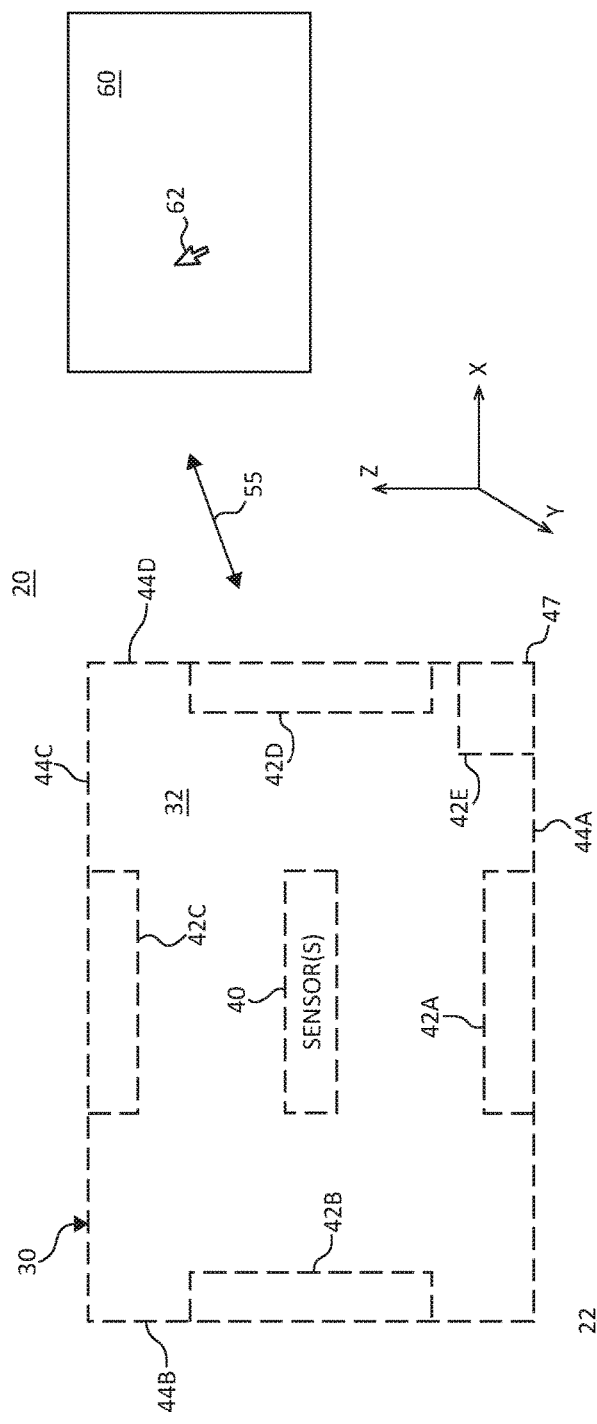
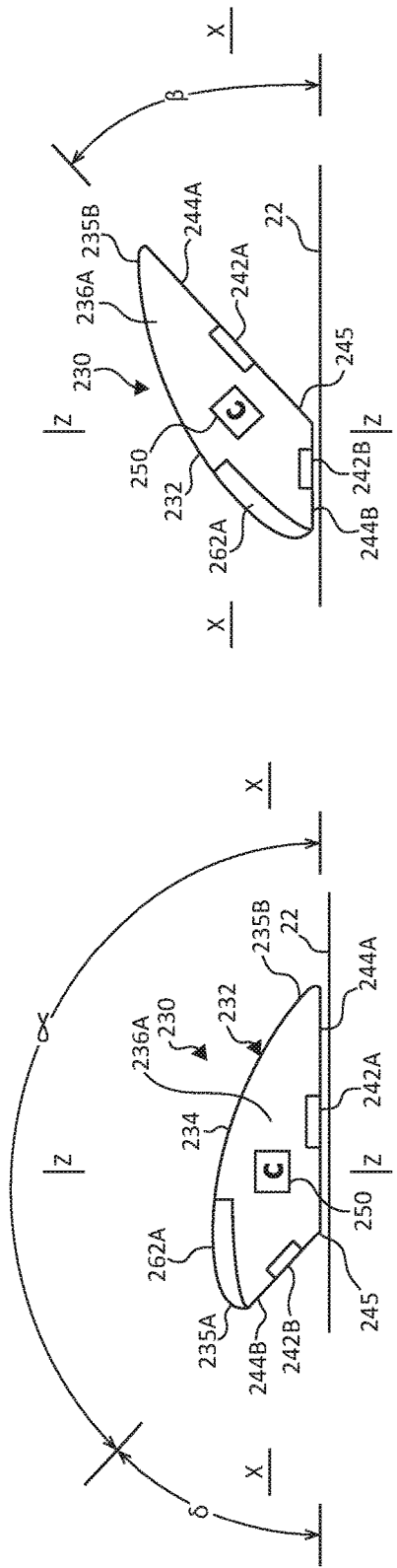
FIG. 1
FIG. 2A
FIG. 2B

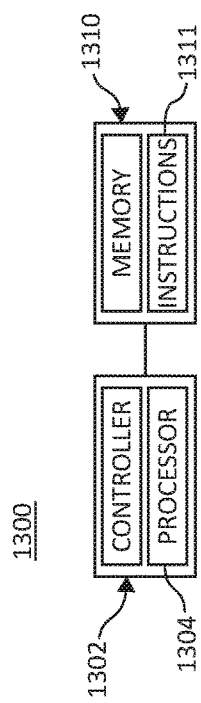
FIG. 17A
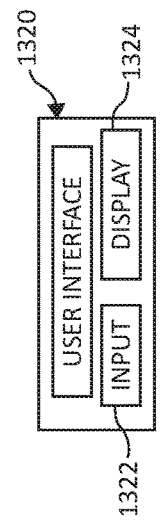
FIG. 17B
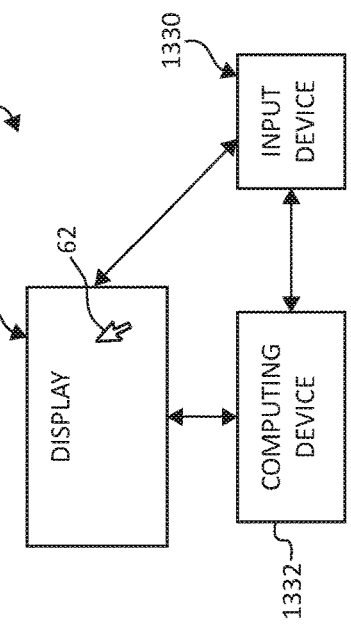
FIG. 17C
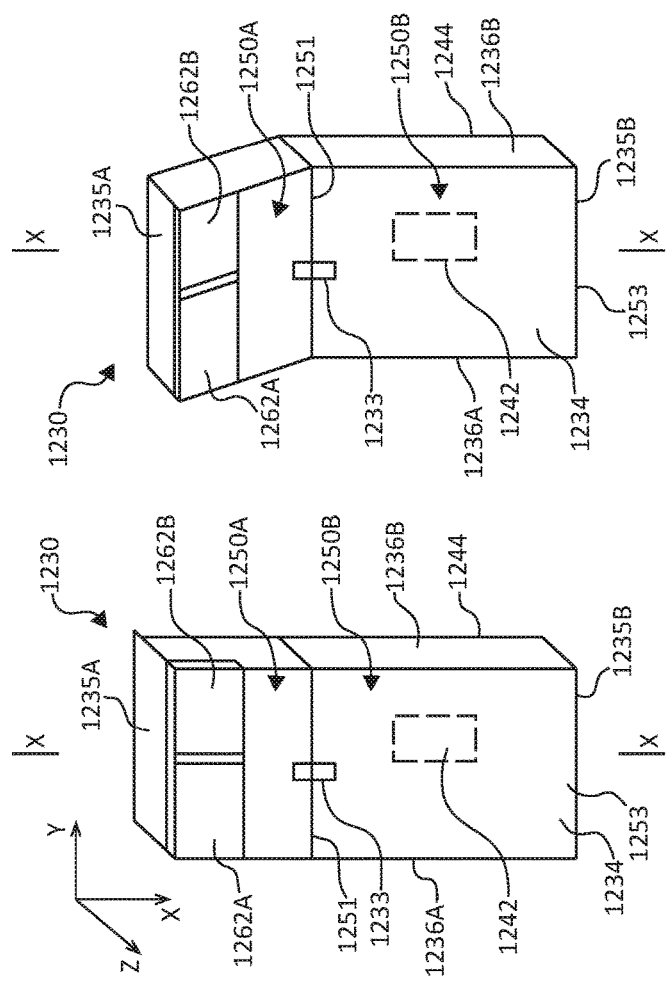
FIG. 16B
FIG. 16A

INPUT DEVICE WITH PRECISION CONTROL

BACKGROUND

An input device may be used to provide cursor control on a display for a computing device, tablet, etc. The input device may be embodied in a wide variety of shapes, modalities, etc. Various aspects of such input devices may provide for control of different functions, such as panning, selecting, dragging, etc.

BRIEF DESCRIPTION OF THE DRAWINGS

FIG. 1 is a block diagram schematically representing an example input device.

FIGS. 2A and 2B are side views schematically representing an example input device in a first position and a second position, respectively.

FIGS. 16A and 16B are isometric views schematically representing an example input device in a first position and a second position, respectively.

FIGS. 17A, 17B, 17C are block diagrams schematically representing an example control portion, example user interface, and example system, respectively.

DETAILED DESCRIPTION

Figure 3:
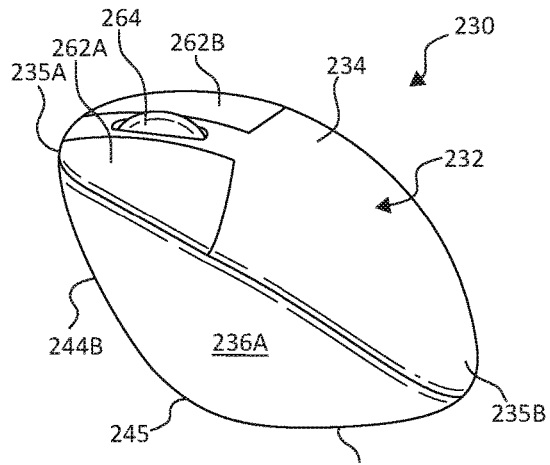
FIG. 3 is an isometric view schematically representing at least a top and side of an example input device.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to providing different precision levels for controlling a cursor on a display. In some examples, an input device comprises a sensor and a housing. The sensor is adapted to provide cursor control on a display based on relative movement between the sensor and a reference surface. The housing at least partially contains the sensor and the housing is adapted to be selectively manipulable relative to the reference surface into a first position to cause operation of the sensor at a first precision level and a second position to cause operation of the sensor at a second precision level different from the first precision level.

In some instances, the first position and second position may sometimes be referred to as first stable orientation and second stable orientation, respectively. In some examples, the different first and second positions may refer to a position of portion (e.g. housing portion or other portion) of an example input device relative to a housing portion of the example input device. In some examples, the different first and second positions may refer to different contact portions of a housing being in releasable slidable contact with a reference surface.

Via such example arrangements, different precision levels of cursor control may be implemented without necessarily changing a grip on the input device and/or without pressing one of several different input buttons. In this way, changing between different precision levels may be implemented intuitively and/or via less complex input devices. Among other uses, such arrangements may be implemented in gaming applications in which frequent and/or rapid changes between different cursor precision levels may be desirable to accommodate the frequent and/or rapidly changing functionality employed by the user. For example, in some instances a first precision level of cursor control which is coarse may be suitable when high speed cursor movement is the desired functionality, whereas a second precision level of cursor control which is fine may be suitable when careful cursor positioning at lower speeds of movement is the desired functionality.

In some examples, a motion of the input device may cause a large motion of the cursor while using a coarse precision, while when using fine precision the same motion of the input device may cause a relatively small motion of the cursor.

In some examples the view on-screen may change when a different precision level is used. For instance, upon initiating use of a coarse precision mode, a displayed image will be zoomed out, so a motion of the input device causes the cursor to move a large distance across the displayed image. Similarly, upon initiating use of a fine precision mode, a displayed image may zoom in, so the same motion of the input device causes the cursor to move a relatively small distance across the displayed image.

In some examples, each of the different precision levels is reflected via a different appearance of the cursor (e.g. larger, smaller, different shape) on the display and/or via some other visible indicator on the display or input device.

At least some example input devices of the present disclosure overcome a challenge faced with commercially available input devices in which a user may be pressing an input button (or two input buttons) for an extended period of time while sliding the input device generally such that the input button device would not be available for other purposes, such as but not limited to, changing a precision level of cursor control associated with the input device. In addition, with at least some example input devices of the present disclosure, one need not remember which input button to press to change a cursor precision level, thereby facilitating more intuitive switching between different cursor precision levels.

In some examples, an example input device may sometimes be referred to as a mouse-like input device or as a mouse.

At least some of these examples, and additional examples, are described and illustrated in association with FIGS. 1-20.

FIG. 1 is a block diagram 20 schematically representing an example input device 30. As shown in FIG. 1, an input device 30 comprises a housing 32 and sensor 40. As represented via dashed lines 32, the housing does not necessarily have the shape shown in FIG. 1 but may have a wide variety of shapes and the sensor 40 may not necessarily have the location shown in FIG. 1, but may reside at any one of a wide variety of locations 42A, 42B, 42C, 42D or other locations on and/or within housing 32. In some examples, sensor 40 may be recessed relative to an external surface of housing 32 or may be directly exposed at the external surface of housing 32 of input device 30.

In some examples, sensor 40 comprises a motion sensor, which may comprise optical modalities and/or other modalities, to detect relative movement between the sensor 40 and a reference surface 22. Such detected relative movement may form the basis for controlling a cursor 62 on display 60 via communication path 55, which may be wired and/or wireless.

As later described in association with at least FIG. 17C, in some examples input device 30 and display 60 may form a part of a system which further comprises a computing device.

In general terms, at least one portion of housing 32 may comprise a contact portion adapted to be in releasable slidable contact relative to reference surface 22 to facilitate movement of input device 30, which in turn facilitates control of cursor 62 on display 60. Accordingly, any one of portions 44A, 44B, 44C, and/or 44D of housing 32 may serve as a contact portion.

In some examples, the reference surface 22 comprises a stable structure, which may be stationary or comprises a structure which is selectively stationary, such as a mobile element. In some examples, the reference surface 22 may be a desktop, lap tray, etc. In some examples, the reference surface 22 may extend in a horizontal plane, a vertical plane, or other planes.

In some examples, the sensor 40 of input device 30 comprises two sensors, each provided to implement a different precision level in cursor control. In some such examples, the different sensors are arranged to be on different portions of an input device such that manipulating the housing of the input device into different positions and/or configurations relative to a reference surface 22 implements respectively different precision levels in operating a cursor 62 on a display 60. At least some such examples are later described in association with at least FIGS. 2A-10.

In some examples, an input device 30 comprises a single sensor 40 which comprises a location 42E within or on housing 32, such as at a junction 42E between two different portions 44A, 44D of housing 32. In some such examples, rotation of the housing 32 to place portion 44D in releasable slidable contact against reference surface 22 will yield a precision level different than when portion 44A is in releasable slidable contact against reference surface 22. One such example arrangement is described and illustrated later in association with at least FIGS. 11A-11C.

In some examples in which input device 30 comprises a single sensor, at least one portion of the housing 32 is manipulated to change its position with respect to another portion of the housing 32 to selectively change a precision level in cursor control. At least some such examples are described and illustrated later in association with at least FIGS. 12A-12B, 13A-13B, and/or 16A-16B.

In some examples in which input device 30 comprises a single sensor, selective rotation of housing 32 about an axis perpendicular to reference surface may selectively implement a greater or lesser precision level in cursor controls, such as later described in association with at least FIGS. 14A-14B and 15A-15B.

With respect to at least FIG. 1, in some examples the respectively different positions (in which a contact portion may be in releasable slidable contact against a reference surface) may sometimes be referred to as respectively different stable orientations of a housing relative to a reference surface. In some examples, a stable orientation is one in which a contact portion of a housing can be maintained in stable slidable contact against the reference surface.

FIGS. 2A and 2B are each a side view schematically representing an example input device 230, which comprises at least some of substantially the same features and attributes as input device 30 in FIG. 1. As shown in FIG. 2A, input device 230 comprises a housing 232 and a pair of sensors 242A, 242B. The housing 232 extends between a front portion 235A and back portion 235A, and between opposite sides 236A and 236B (not shown). The housing 232 comprises a first contact portion 244A with sensor 242A and a second contact portion 244B with sensor 242B. It will be understood that sensors 242A, 242B may comprise any one of a wide variety of different types of sensors. In some examples, each sensor 242A, 242B may comprise a sensor which may be recessed relative to a surface of the respective contact portions 244A, 244B or which may be exposed directly at the surface of the respective contact portions 244A, 244B.

The input device 230 may comprise at least one input button 262A but typically comprises at least two input buttons, which may be used to select a wide variety of various functions in association with a cursor 62 on a display 60.

In addition, the input device 230 may comprise a control portion (C) 250, or at least part of a control portion 250, to generally control operation of sensor 242A, 242B in association with movement of input device 230 to control cursor 62 on display 60, including but not limited to, implementing different cursor control precision levels. In some examples, control portion 250 may comprise at least some of substantially the same features as control portion 1300, as later described in association with at least FIGS. 17A-17B. In addition, while not explicitly shown in subsequent Figures illustrating other example input devices, it will be understood that such input devices may comprise a control portion (C) 250, as in FIGS. 2A-2B.

As further shown in FIG. 2A, in some examples contact portion 244B extends at an obtuse angle α relative to contact portion 244A. In some examples, this angle α may be about 120 to about 160 degrees. In some examples, this angle α may be about 130 degrees to about 150 degrees. Accordingly, when one of the contact portions, such as contact portion 244A is placed into releasable contact relative to reference surface 22, the other contact portion 244B is spaced apart from reference surface 22 by a complementary angle θ. In this way, just one of two different sensors 242A, 242B is able to control cursor 62 at any given point in time.

In some examples, sensor 242A may be set to operate at a first precision level while sensor 242B may be set to operate at a different second precision level. The second precision level may be greater than or less than the first precision level, depending on a preference of the user or the type of application being used. In some examples, the second precision level is substantially different from the first precision level. In some examples, the term substantially different comprises a difference of at least 10 percent, at least 20 percent, at least 30 percent, at least 40 percent, or at least 50 percent. In some examples, the term substantially different comprises a difference of at least 100 percent difference.

In some examples, the magnitude of difference is selectable by the user. The selectable magnitude of difference may correspond to the example differences noted above or may comprise quantitative differences other than those noted above. In some such examples, the selection may be implemented via an adjustment element such as later described in association with at least FIGS. 6A and 6B.

Unless otherwise noted, these examples regarding substantial differences between precision levels apply to the examples described later in association with FIGS. 7A-16B. In some examples, one set precision level may be at least one order of magnitude different from another set precision level.

In some examples, sensor 242A is set to operate in a general or coarse mode (e.g. first precision level) and sensor 242B is set to operate in fine mode, e.g. a second precision level which is greater than the first precision level. However, in some examples, sensor 242A may be set to operate in a fine mode (e.g. first precision level) and sensor 242B may be set to operate in a coarse mode (e.g. second precision level).

With this in mind, as shown in FIG. 2A a user may use the input device 230 with contact portion 244A in releasable slidable contact against reference surface 22 to operate cursor 62 (FIG. 1) via sensor 242A at a first precision level, such as a general or coarse precision level. As shown in the diagram of FIG. 5A, the input device 230 may be moved across reference surface 22 in one or both of an x orientation or a y orientation to position cursor 62 on display 60.

Figure 4:
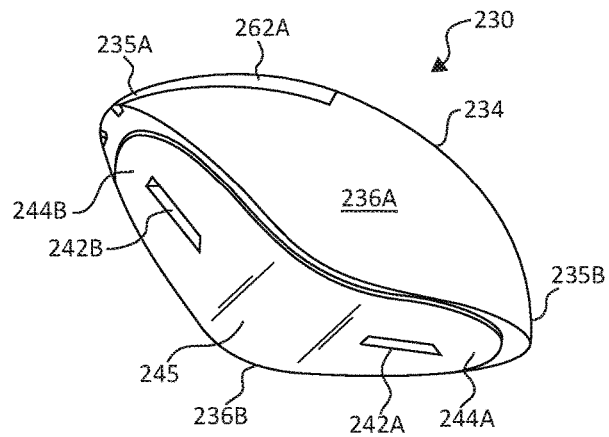
FIG. 4 is an isometric view schematically representing at least a bottom and side of an example input device.
Figure 5A:
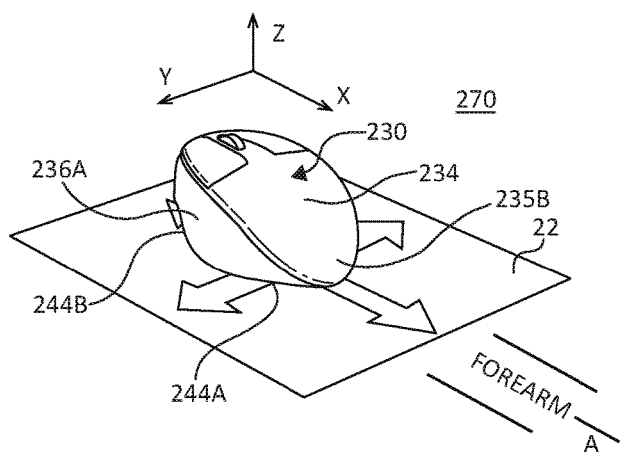
FIGS. 5A and 5B are each a diagram schematically representing movement of an example input device relative to a reference surface when in its first position and in its second position, respectively.
Figure 5B:
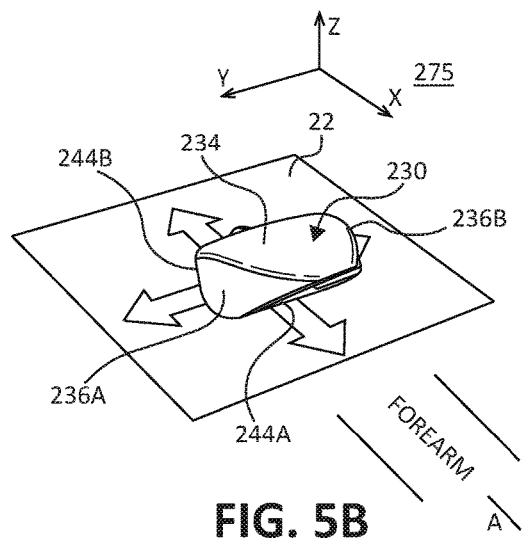

At any desired point in time, the user may rotate housing 232 forward about junction 245 (FIGS. 2A-2B, 4) until contact portion 244B is in releasable contact against reference surface 22, as shown in FIG. 2B, 5B, to cause operation at a second precision level, such as a fine cursor control. As shown in the diagram 290 of FIG. 5B, the input device 230 may be moved in one or both of the x and y orientations while operating at the second precision level.

Accordingly, the user may seamlessly switch between the two different precision levels by a mere tilt or rocking of the housing 232 between the two different positions shown in FIGS. 2A, 5A and 2B, 5B. This arrangement enables a fast, intuitive way to switch between operation at the different precision levels without pressing an input button in order to change the precision level and/or without necessarily changing the user's grip on the input device or its controls.

As shown in at least FIGS. 5A-5B, movement between a first position shown in FIG. 5A and the second position shown in FIG. 5B occurs about a y axis, which may sometimes be referred to as "pitch." In some such examples, rotation of housing 232 occurs about the y-axis generally perpendicular to a longitudinal axis A of a user's forearm involved in handling the input device 230.

However, it will be understood that in some examples, a housing may comprise contact portions 244A, 244B and junction 245 arranged to pivot or rotate about the x-axis (i.e. roll) into two different positions in order to implement two different precision levels. Moreover, in some examples, such contact portions 244A, 244B and junction 245 may be arranged to rotate with both an x-axis component (i.e. roll) and a y-axis component (i.e. pitch), as later described in association with at least FIGS. 7A-7B.

FIGS. 3 and 4 provide isometric view of one example implementation of the example input device 230 with similar reference numerals referring to similar elements in FIGS. 2A-2B.

Figure 6A:
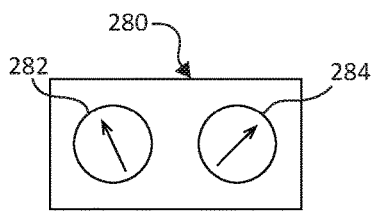
FIGS. 6A-6B are each a side view schematically representing a first example adjustment element and a second adjustment element, respectively, of an example input device.
Figure 6B:
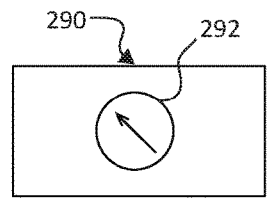

FIGS. 6A and 6B are each a side view schematically representing an example adjustment element 280 and example adjustment element 290, respectively, of an example input device.

In some examples, either one of or both of adjustment elements 280, 290 may be implemented in one of the previously described example input devices 30, 230 (FIGS. 1-5B) or example input devices later described in association with at least FIGS. 7A-16B.

As shown in FIG. 6A, in some examples adjustment element 280 comprises a first adjustable input 282 to variably select a first precision level for a first position or for a first contact portion of an input device and a second adjustable input 284 to variably select a second precision level for a second position or for a second contact portion of an input device. Accordingly, in such examples the respective first and second precision levels may be adjusted independently.

In some examples, the first adjustment input 282 may be associated with a first sensor used for a first position (or first contact portion) of a housing of an input device while the second adjustment input 284 may be associated with a second sensor used for a second position (or second contact portion) of a housing of an input device. In some examples, this arrangement may be implemented for at least the input device 230 in FIGS. 2A-5B.

However, in some examples, both of the first and second adjustment inputs 282, 284 may both be associated with a single sensor (i.e. the same sensor) wherein the first adjustment input 282 corresponds to a first position or to a first contact portion of a housing of an input device and the second adjustment input 284 corresponds to a second position or to a second contact portion of a housing of an input device. In some examples, this arrangement may be implemented for at least one of the input devices in FIGS. 7A-8B, 11A-16B.

As shown in FIG. 6B, in some examples adjustment element 290 comprises a single adjustment input 292 to variably select a difference between two different precision levels, such as a first precision level for a first position (or a first contact portion) of an input device and a second precision level for a second position (or a second contact portion) of an input device. In some examples the adjustment element 290 may be used in examples in which two different sensors are present on an input device or in examples in which a single sensor is present on an input device.

Figure 7A:
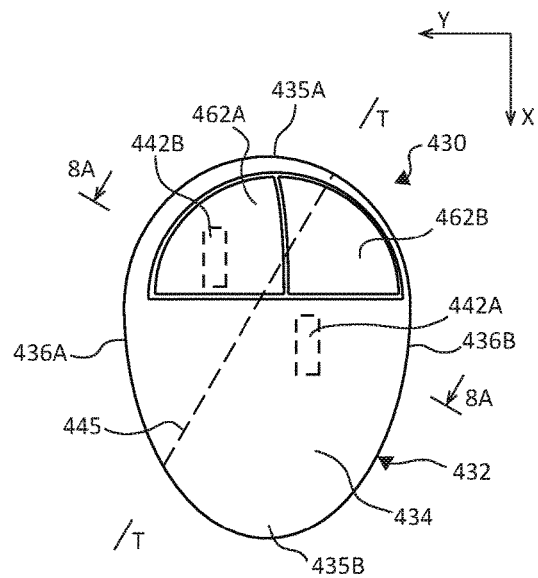
FIGS. 7A and 7B are top and isometric views, respectively, schematically representing an example input device.
Figure 7B:
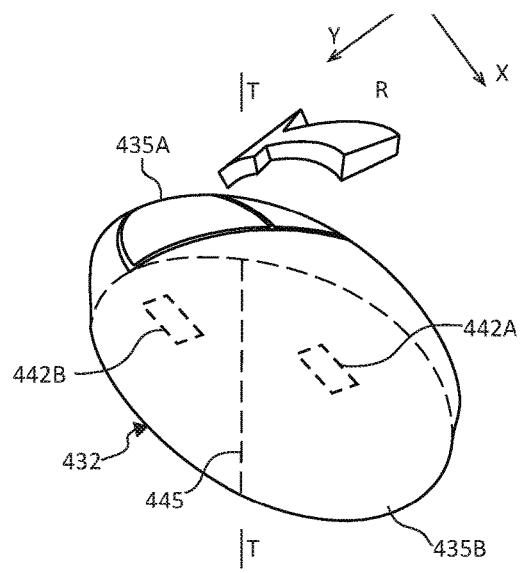

FIG. 7A is a top view schematically representing an example input device 430. In some examples, the input device 430 comprises at least some of substantially the same features and attributes as input device 230, as previously described in association with at least FIGS. 2A-6B. The housing 232 comprises a front portion 435A and opposite back portion 435B, opposite sides 436A, 436B, and a top portion 436. In some examples, a pair of input buttons 462A, 462B are arranged adjacent front portion 435A. As further shown in the sectional view of FIG. 8A as taken along lines 8A-8A of FIGS. 7A-7B, a bottom portion 441 of housing 232 comprises a first contact portion 444A with a first sensor 442A and a second contact portion 444B with a second sensor 442B and a junction 445 between the respective first and second contact portions 444A, 444B. As further shown in FIG. 8A, in one mode of operation the first contact portion 444A may be in releasable contact against reference surface 22 to operate input device 430 in the first precision level via sensor 442A. At any point in time, a user may rotate the input device 430 forward as represented by directional arrow R in FIG. 7B in a tilting or rocking motion about junction 445 to cause second contact portion 444B to releasably contact reference surface 22, as shown in the sectional view of FIG. 8B. In this way, user may elect to operate input device 430 at a second precision level via sensor 442B while being able to switch back to the first precision level at any time.

In one aspect, switching between the first position (FIG. 8A) and the second position (FIG. 8B) occurs via rotation of housing 432 about axis T of junction 445 (FIGS. 7A-7B), which includes both a y-axis component (i.e. pitch) and an x-axis component (i.e. roll).

Figure 8A:
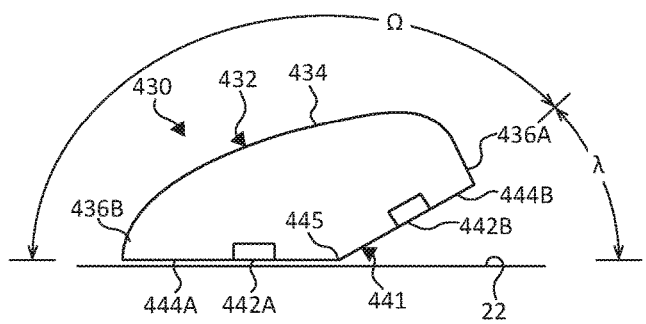
FIGS. 8A and 8B are each a sectional view schematically representing an example input device relative to a reference surface when in its first position and in its second position, respectively.
Figure 8B:
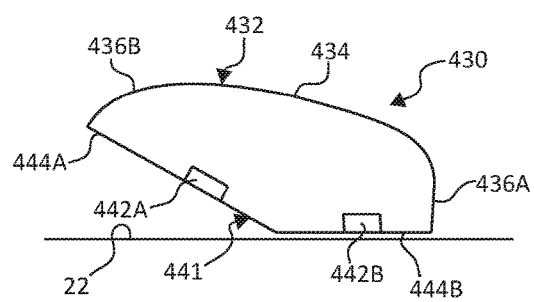

As further shown in FIG. 8A-8B, in some examples contact portion 444B extends at an obtuse angle Ω relative to contact portion 444A. In some examples, this angle Ω may be about 120 to about 160 degrees. In some examples, this angle Ω may be about 130 degrees to about 150 degrees. Accordingly, when one of the contact portions, such as contact portion 444A is placed into releasable contact relative to reference surface 22, the other contact portion 444B is spaced apart from reference surface 22 by a complementary angle λ. In this way, just one of two different sensors 442A, 442B is able to control cursor 62 at any given point in time.

In some examples, the different precision levels implemented via input device 430 may comprise substantially the same attributes (e.g. substantially different, greater, lesser, etc.) as previously described in association with at least FIGS. 1-5B.

Figure 9:
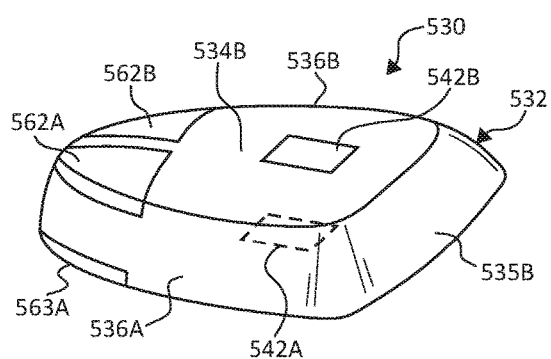
FIGS. 9 and 10 are isometric views schematically representing opposite top and bottom portions, respectively, of an example input device.
Figure 10:
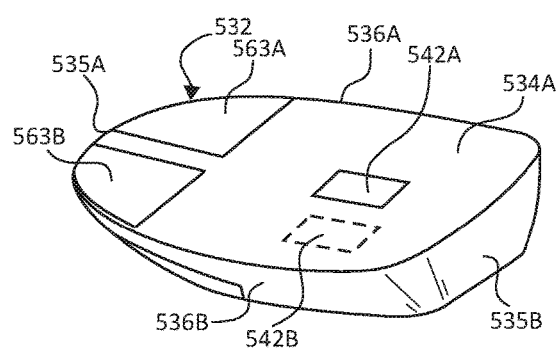

FIGS. 9-10 are each an isometric view schematically representing an example input device 530. As shown in FIG. 9, input device 530 comprises at least some of substantially the same features and attributes as input device 230, 430 as previously described in association with FIGS. 1-8B, except having one sensor 542B on a top contact portion 534B of housing 532 and one sensor 542A on a bottom contact portion 534A of housing 532, among other differences. In some examples, housing 532 comprises front portion 535A, opposite back portion 535B, and opposite sides 536A, 536B. In some examples, sides 536A, 536B are tapered, i.e. angled between top contact portion 534B and bottom contact portion 534A to facilitate gripping and handling of housing 532 of input device 530.

In some examples, the input device 530 may be used in one position in which bottom portion 534A is in releasable slidable contact against a reference surface 22 and in which sensor 542A detects relative movement between the input device 230 and reference surface 22. Meanwhile, a user may flip the input device 230 over to place the opposite top contact portion 534B in releasable slidable contact against reference surface 22 such that sensor 542B detects relative movement between the input device 230 and reference surface 22. In some examples, sensor 542A may operate at a first precision level, while sensor 542B may operate at a different second precision level, or vice versa.

In some examples, the opposite tapered sides 536A, 536B provided differently angled grips depending on whether the bottom contact portion 534A or top contact portion 534B is in slidable contact with reference surface 22, thereby providing an intuitive way for the user to immediately determine which mode (i.e. precision level) the input device 530 is deployed at any given time.

In some examples, the different precision levels implemented via input device 430 may comprises substantially the same attributes (e.g. substantially different, greater, lesser, etc.) as previously described in association with at least FIGS. 1-5B.

In some examples, top contact portion 534B of input device 530 comprises input buttons 562A, 562B adjacent front portion 535A and available for use when bottom contact portion 534A is in releasable contact with reference surface 22 while bottom contact portion 534A of input device 530 comprises input buttons 563A, 563B available for use when top contact portion 534B is in releasable contact with reference surface 22.

Via this arrangement, a user may conveniently switch between different precision levels by simply flipping the input device 230 over.

Figures 11A, 11B, 11C, 12A, 12B:
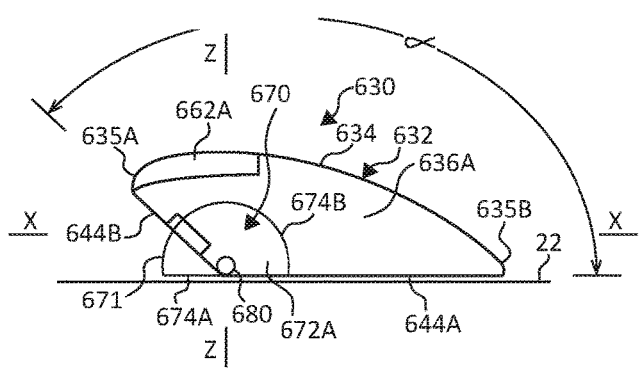
FIGS. 11A and 11B are each a diagram schematically representing an example input device relative to a reference surface when in its first position and in its second position, respectively.
FIG. 11C is a bottom view schematically representing the example input device of FIGS. 11A-11B.
FIGS. 12A and 12B are side views schematically representing an example input device in a first position and a second position, respectively.

FIGS. 11A-11B are side views, and FIG. 11C is a bottom view, schematically representing an example input device 630. In some examples, input device 630 comprises at least some of substantially the same features and attributes as the input devices previously described in association with at least FIGS. 1-10, except for comprising a single sensor 673, among other differences.

As shown in FIGS. 11A-11C, in some examples input device 630 comprises a housing 632 extending between a front portion 635A and opposite back portion 635B, and opposite sides 636A, 636B. In some examples, the housing 632 may comprise a shape substantially the same as the shape of housing 232 of input device 230 in FIGS. 2A-2B. Like input device 230, housing 632 comprises a first contact portion 644A and a second contact portion 644B extending at an obtuse angle α relative first contact portion 644A. However, unlike input device 230, the input device 630 comprises a single sensor 673 within a sensor unit 670, as shown in FIG. 11C. As shown in FIGS. 11A-11C, the sensor unit 670 comprises a housing 671 having opposite sides 672A, 672B and opposite ends (e.g. front portion, back portion) 675A, 675B, as well as a bottom contact portion 674A (FIG. 11C) and opposite top portion 674B (FIGS. 11A-11B). In some examples, top portion 674B may comprise an arcuate shape, such as a semi-circular shape while bottom contact portion 674A comprises a generally planar shape suitable for releasable slidable contact against reference surface 22.

In some examples, sensor unit 670 is pivotally mounted relative to housing 632 via pivot element 680. Accordingly, with bottom contact portion 674A of sensor unit 670 in releasable slidable contact against reference surface 22 as shown in FIGS. 11A-11B, the housing 632 may be in a first position shown in FIG. 11A in which first contact portion 644A is also in releasable slidable contact with reference surface. However, via pivot element 680 the user may manipulate housing 632 to pivot, relative to sensor unit 670, into a second position in which the second contact portion 644B of housing 632 moves into releasable slidable contact against reference surface 22 as shown in FIG. 11B.

In some examples, sensor 673 may operate at a first precision level when housing 632 of input device 630 is in the first position shown in FIG. 11A, while sensor 673 may operate at a different second precision level when housing 632 of input device 630 is in the second position shown in FIG. 11B.

In some examples, the different precision levels implemented via input device 430 may comprise substantially the same attributes (e.g. substantially different, greater, lesser, etc.) as previously described in association with at least FIGS. 1-5B.

In some examples, the input device 630 comprises a second sensor to detect relative movement between housing 634 and sensor unit 670, and thereby determine whether the housing 634 is in the first position (FIG. 11A) or the second position (FIG. 11B) and thereby implement the first precision level or the second precision level. In some examples, the second sensor is coupled with or incorporated within pivot element 680 while in some examples, second sensor 681 may be located elsewhere.

Accordingly, via such arrangements, a user may quickly change between different precision levels in cursor control merely by pivoting housing 634 between the first position (FIG. 11A) and the second position (FIG. 11B) without otherwise interrupting or altering use of the other functions (sliding, dragging, etc.) of the input device 630. For instance, a user may use the input device 630 in the first position at a first precision level (e.g. coarse) and then quickly change to a second precision level (e.g. fine) merely by pivoting housing 634 to the second position and switching back to first position and first precision level whenever desired. This change in precision can be performed without interrupting an operation in progress, such as dragging an object on the display 60 with one of the input buttons 662A, 662B depressed.

In some examples, movement between the first and second positions occurs via rotation about a y-axis, which is generally perpendicular to a longitudinal axis A of a user's forearm.

FIGS. 12A-12B are each a side view schematically representing an example input device 730. In some examples, input device 730 comprises at least some of substantially the same features and attributes as the input devices previously described in association with at least FIGS. 11A-11C, except for comprising a spring 754 or similar biasing element and differently located pivot point for housing 732, among other differences.

As shown in FIGS. 12A-12B, in some examples input device 730 comprises a housing portion 732, which extends between a front portion 735A and opposite back portion 735B, and opposite sides 736A and 736B (not shown). Input device 730 also may comprise input buttons 762A, 862B (not shown). A bottom contact element 752 extends rearwardly from sensor unit 670 toward back portion 735B, and is adapted for releasable slidable contact (with sensor unit 670) against reference surface 22. Spring 574 extends between, and connects, a back portion 753 of bottom contact element 752 to back portion 735B of housing 732. Spring 754 biases housing 732 into the position shown in FIG. 12A in which the front contact portion 744B of housing 732 is in slidable contact with reference surface 22, and in which a first precision level of cursor control via sensor unit 670 is implemented. In addition, bottom contact element 752 also may be in slidable contact with reference surface 22 at the same time as front contact portion 744B.

Moreover, despite bottom contact element 752 being in contact with reference surface 22, in this position shown in FIG. 12A, the bottom portion 745 of housing 732 is spaced apart from the bottom contact element 752 to form angle (I) and with back portion 735B of housing 732 spaced apart from back end 753 of bottom contact element 752 by a distance D1.

Meanwhile, housing 732 is pivotally mounted to sensor unit 670 via pivot element 680. As further shown via FIG. 12A, the pivot point is identified by distances L2 and/or L3 relative to a total length L1 of the housing 732. An input device 730 can be constructed with the pivot point at different locations by adjusting the relative lengths of L2 and L3.

In some examples, a user may transition from operation of sensor unit 670 at a first precision level to a second precision level via pressing downward with their palm or heel of their palm to compress spring 754 and move housing 732 into the second position shown in FIG. 12B which signals sensor unit 670 to operate at the second precision level. In this second position, front contact portion 744B is no longer in releasable slidable contact with reference surface 22. However, bottom contact element 752 remains in slidable contact with reference surface 22.

A user may quickly switch between the two positions shown in FIGS. 12A-12B by simply pressing downward near back portion 735B of housing 732 to move housing 732 into the second position and operation at a second precision level, or may release any such pressure for operation at the first precision level when in the first position shown in FIG. 12A.

In some examples, the different precision levels implemented via input device 830 may comprise substantially the same attributes (e.g. substantially different, greater, lesser, etc.) as previously described in association with at least FIGS. 1-5B.

As in the example input device 630, the pivot element 680 may incorporate a sensor to determine and track which position the housing 732 is in, and thereby trigger operation in the first or second precision levels, respectively. In some examples, such a sensor also may be located elsewhere on housing 732.

In some examples, when the housing 732 is in the first position, the first precision level corresponds to a fine precision level and when in the second position, the second precision level corresponds to a coarse precision level. This configuration may be intuitive for a user as the tips of the fingers, which are adapted for fine manipulation, may play a more dominant role in operating the input device when the housing 732 is in the first position. Similarly, use of the palm or heel of the hand to initiate and maintain operation in the second position via holding down the back portion 735B of the housing would intuitively correspond to the coarse precision level since the palm or heel of a user's hand is generally used (i.e. when not using an input device) in a coarser manner than when using the fingers to exercise control of an object.

Figure 13A:
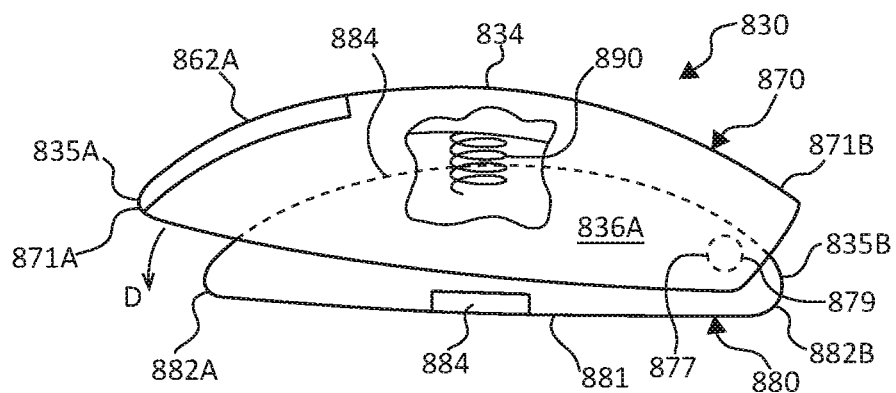
FIGS. 13A and 13B are side views schematically representing an example input device with an upper housing portion in a first position and a second position, respectively, relative to a lower housing portion.
Figure 13B:
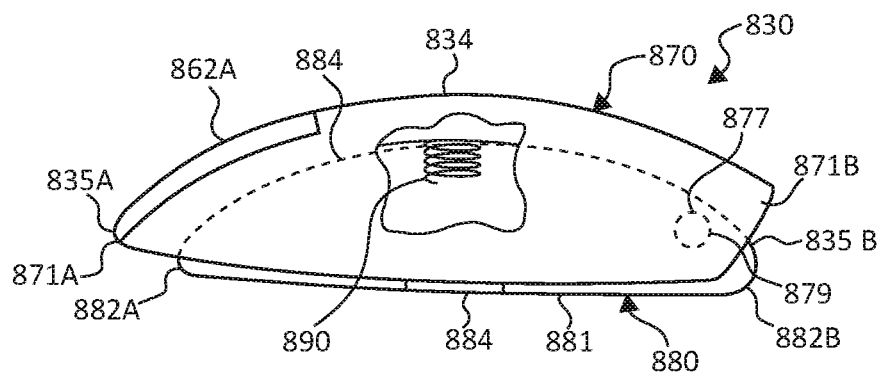

FIGS. 13A-13B are each a side view schematically representing an example input device 830. In some examples, input device 830 comprises at least some of substantially the same features and attributes as the input devices previously described in association with at least FIGS. 1-12B, except for comprising a single sensor 884 and top and bottom housing portions 870, 880, among other differences.

As shown in FIGS. 13A-13B, in some examples input device 830 comprises a top housing portion 870 and bottom housing portion 880, both of which extend between a front portion 835A and opposite back portion 835B, and opposite sides 836A and 836B (not shown). Input device 830 also may comprise input buttons 862A, 862B. The bottom housing portion 880 comprises a contact portion 881, which comprises a single sensor 884, and is adapted for releasable slidable contact against reference surface 22. As previously noted, in some examples sensor 884 may be recessed from the external surface of contact portion 881.

In some examples, adjacent back portion 835B, top housing portion 870 is pivotally mounted relative to bottom housing portion 880 via pivot element 879, which may comprise a hinge or similar structure. Via pivot element 879, top housing portion 870 is selectively movable between a first position relative to bottom housing position 880 as shown in FIG. 13A and a second position relative to bottom housing portion 880 shown in FIG. 13B. Via a spring 890 or other biasing structure, top housing portion 870 is biased in the first position (FIG. 13A) and movable into the second position shown in FIG. 13B upon the user overcoming the biasing pressure of spring 890. During such movement, a back portion 871B of top housing portion 870 experiences little movement adjacent back portion 882B of bottom housing portion 880, while opposite front portion 871A of top housing portion 870 experiences a greater range of motion adjacent to, and relative to, front portion 882A of bottom housing portion 880, as represented by directional arrow D.

Upon a user's release of at least front portion 871A of top housing portion 870, the spring 890 causes the top housing portion 870 to return to the first position shown in FIG. 13A.

As further shown in FIGS. 13A-13B, bottom housing portion 880 comprises a top portion 884 which is spaced apart from top portion 834 of top housing portion 870. In some examples, a spring 890 is mounted onto, and extends between, the respective top portions 834, 884 of the respective top and bottom housing portions 870, 880.

In some examples, sensor 884 may operate at a first precision level when top housing portion 870 is in the first position shown in FIG. 13A, while sensor 884 may operate at a different second precision level when top housing portion 870 is in the second position shown in FIG. 13B.

In some examples, the different precision levels implemented via input device 830 may comprise substantially the same attributes (e.g. substantially different, greater, lesser, etc.) as previously described in association with at least FIGS. 1-5B.

In some examples, the input device 830 comprises a second sensor 877 to detect movement of top housing portion 870 relative to bottom housing portion 880, and thereby determine whether the top housing portion 780 is in the first position (FIG. 13A) or the second position (FIG. 13B) and thereby implement the first precision level or the second precision level. In some examples, the second sensor 877 may be located adjacent to and/or be incorporated as part of pivot element 879. However, in some examples the second sensor 877 may be located elsewhere on input device 830, such as but not limited to, a location adjacent the respective front portions 871A and 882A of the respective top and bottom housing portions 870, 880.

Accordingly, via such arrangements, a user may quickly change between different precision levels in cursor control merely by pressing top housing portion 870 downward or releasing the top housing portion 870 back to the first position (FIG. 13A) without otherwise interrupting or altering use of the other functions (sliding, dragging, etc.) of the input device 830. For instance, a user may use the input device 830 in the first position at a first precision level (e.g. coarse) and then quickly change to a second precision level (e.g. fine) merely by repositioning top housing portion 870 to the second position and switching back to first position and first precision level whenever desired.

Figure 14A:
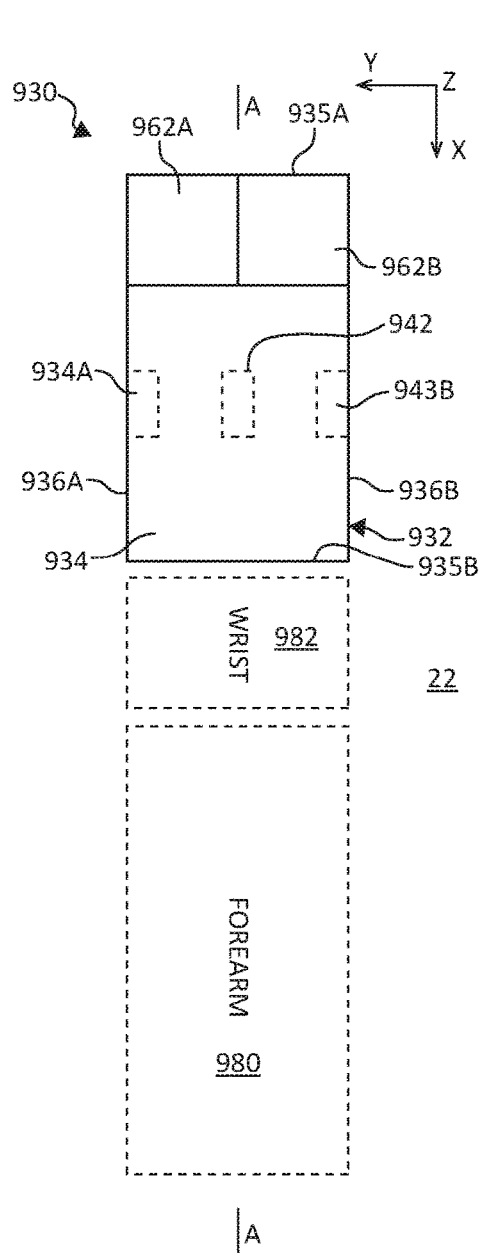
FIGS. 14A and 14B are each a top view schematically representing an example input device in a first position and a second position, respectively.
Figure 14B:
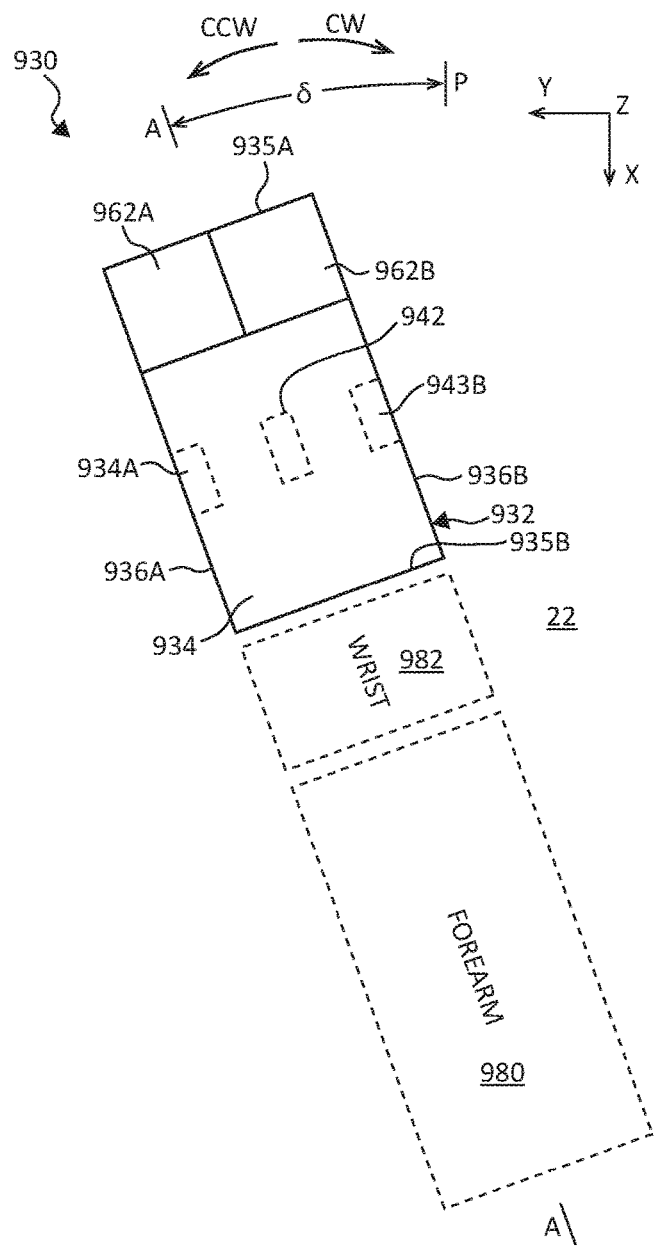

FIGS. 14A-14B are each a top view schematically representing an example input device 930. In some examples, input device 930 comprises at least some of substantially the same features and attributes as the input devices previously described in association with at least FIGS. 1-13B, except for comprising a sensor 942 for controlling a cursor and additional sensors 934A and/or 934B for at least determining an orientation of the input device 930, among other differences.

As shown in FIGS. 14A-14B, in some examples input device 930 comprises a housing portion 932 including a front portion 935A and opposite back portion 935B, and opposite sides 936A and 936B. Input device 930 also may comprise input buttons 962A, 962B. Housing 932 also comprises a top portion 934 and comprises opposite bottom contact portion 944 (not shown), which comprises a sensor 942 (shown in dashed lines), and which is adapted for releasable slidable contact against reference surface 22.

In some examples, input device 930 also comprises the first sensor 943A and/or second sensor 943B for determining an angular orientation of housing 932 as further described below, among other possible uses. In some such examples, the first and second sensors 943A, 943B are located at or near the opposite sides 936A, 936B of the housing 932.

In some examples, as shown in FIG. 14A the input device 930 is in a first orientation or position in which a longitudinal axis A of the housing 932 of the input device 930 is aligned with and/or generally parallel to a longitudinal axis A of a user's forearm 980. In some such examples, in this stable orientation, sensor 942 may be operated at a first precision level. In some instances, the input device 930 may be referred to as pointing forward.

In some examples, the first precision level may comprise a fine precision level in which movements of the input device 930 relative to a reference surface 22 produce relatively small movements of the cursor 62 on a display 60 (FIG. 1). In one aspect, associating the forward pointing orientation of the input device 930 with a higher precision level may be intuitive for the user because their fingers are generally pointing forward similar to the way in one might point at least one finger forward to indicate something with more precision or perform a task with a finger or fingers.

However, in some instances, the user may desire to employ a second precision level different from the first precision level. In some examples, this second precision level may be more coarse, i.e. a lower precision than the first precision level in the first orientation shown in FIG. 14B. Accordingly, in such instances, the user may implement the second precision level by moving the input device 930 into a different second position as shown in FIG. 14B. In particular, the user may rotate their wrist 982 and/or forearm 980 to cause rotation of the input device 930 about axis Z to cause a longitudinal axis A of the input device housing 932 to extend an angle σ relative to the plane P through which the longitudinal axis A of the housing 932 extended (or was parallel to) when in the first orientation in FIG. 14B. In some instances, this rotation may be sometimes described as a rotation of the input device 930 in the plane of the reference surface 22. In some examples, this rotation occurs in a counter-clockwise direction as shown by the difference in FIGS. 14A-14B and the directional arrow CCW. However, in some examples, the rotation may occur in a clockwise direction (as represented via directional arrow CW), depending upon the preference of the user or whether the user is left or right handed.

In some examples, the threshold angle at which the precision level shifts between the first and second precision level may comprise an angle σ of at least 10 degrees. In some examples, the threshold angle may comprise an angle σ of at least 15 degrees. In some examples, the threshold angle may comprise an angle σ of at least 20 degrees. In some examples, the threshold angle may comprise an angle σ of at least 30 degrees.

Of course, the user may rotate the input device 930 from the second position (FIG. 14B) back to the first position (FIG. 14A) to resume operation at the first precision level. Moreover, one may choose to initiate use of the input device 930 in the position (i.e. stable orientation) shown in FIG. 14B.

In this arrangement, two different stable positions of the housing (e.g. FIGS. 14A, 14B) of the input device 930 corresponding to two different precision levels (by which sensor 942 may operate) differ in the angular orientation of the input device 930 rather than by a change in position of different portions of a housing relative to each other or relative to reference surface, as described in at least some other example input devices of the present disclosure. In one aspect, the second position of the input device 930 shown in FIG. 14B may result in a side of the palm of a user's hand pointing forward, which resembles a broad sweeping motion, which a user may intuitively associate with a lower precision of cursor control.

In one example, the determination of the angular orientation (e.g. angle σ) of the input device 930 may be implemented via the sensors 943A, 943B which are in or near slidable contact with the reference surface 22. The difference in sensed motion between the two spaced apart sensors 943A, 943B corresponds to angular rotation of the input device 930 about axis Z. In some examples, a clockwise rotation of input device 930 (directional arrow CW) causes the left sensor 943A to detect a forward motion (e.g. away from the user's body), while the right sensor 943B detects a backward motion.

In some examples, the different precision levels implemented via input device 830 may comprise substantially the same attributes (e.g. substantially different, greater, lesser, etc.) as previously described in association with at least FIGS. 1-5B.

However, in some examples, the first precision level associated with the orientation of input device 930 shown in FIG. 14A may comprise a coarse precision level and the second precision level associated with the orientation of input device 930 shown in FIG. 14B may comprise a fine precision level.

Figure 15A:
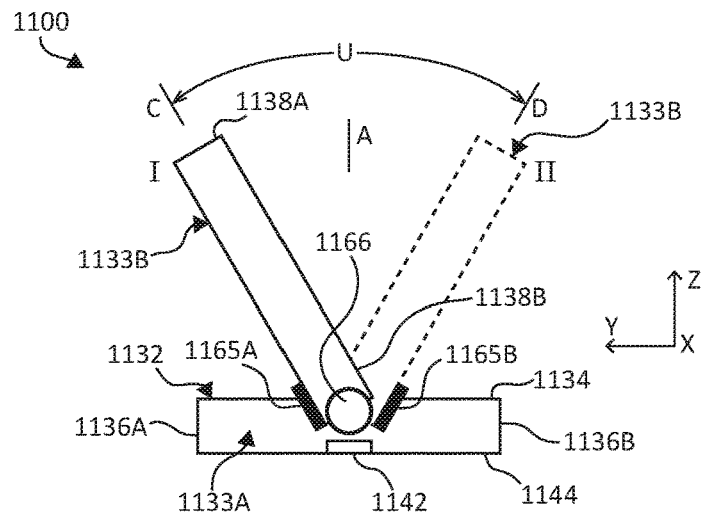
FIGS. 15A, 15B, 15C are each a sectional view schematically representing an example input device.
Figure 15B:
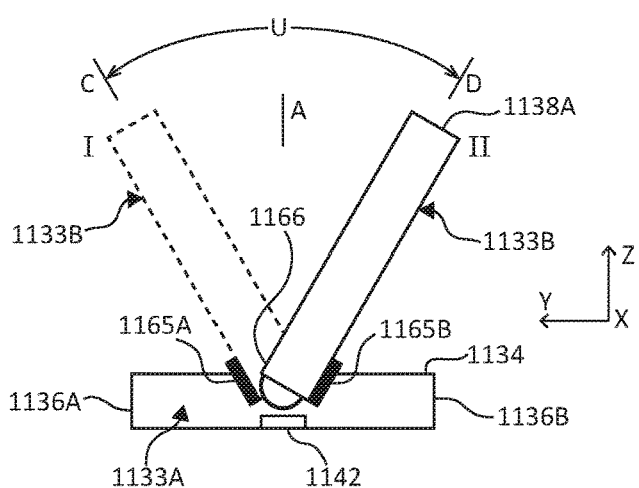

FIGS. 15A-15B are each a sectional view schematically representing an example input device 1130. In some examples, input device 1130 comprises at least some of substantially the same features and attributes as the input devices previously described in association with at least FIGS. 1-14B, except for comprising a generally vertically upright portion 1133B movable relative to a lower portion 1133A, among other differences. Accordingly, while not shown in FIG. 15A-15B, it will be understood that a lower portion 1133A includes a front portion and opposite back portion, as well as input buttons, as the previous examples. As shown in FIGS. 15A-15B, lower portion 1133A comprises opposite sides 1136A and 1136B, as well as a top portion 1134 and opposite bottom contact portion 1144 with sensor 1142 and adapted for releasable slidable contact against reference surface (e.g. 22 in FIG. 1). In some examples, the lower portion 1133A may sometimes be referred to as a lower housing portion.

Lower portion 1133A of input device 1130 is slidable movable in a generally flat or planar position on a reference surface in a plane defined by the x-axis and y-axis, as in at least some of the previously described examples, to control movement of a cursor 62 on a display 60 (FIG. 1).

As further shown in FIGS. 15A-15B, input device 930 comprises an elongate portion 1133B which extends generally upright or vertical position relative to lower portion 1133A. In some instances, the elongate portion 1133B may be referred to as a post or stick. As shown in FIGS. 15A-15B, portion 1133B is rotatable (e.g. pivotable) about an x-axis between a first position I and a second position II. The elongate portion 1133B includes a first end 1138A (e.g. a free end) and an opposite second end 1138B which is pivotally mounted relative to lower portion 1133A via a pivot element 1166. In some examples, the range of pivotal motion of elongate portion 1133B is constrained to rotational movement about the x-axis. In other words, in some examples the elongate portion 1133B is not capable of pivotal movement about the y-axis.

Moreover, in some examples, such pivotal movement about the x-axis is limited by stops 1165A, 1165B such that the range of pivotal motion is defined by an angle U between plane C (the first position) and plane D (the second position). In some examples, the angle U may be between about 20 degrees to 60 degrees. In some examples, via a spring or other biasing element incorporated within or associated with pivot element 1166, the elongate portion 1133B may be biased in the first position I or the second position II.

Via such arrangements, a user may operate the input device 1130 with sensor 1142 to control a cursor 62 on a display 60 (FIG. 1) at a first precision level when portion 1133B is in the first position I and at a different second precision level when portion 1133B is in the second position II. To do so, the user would tilt or pivot the portion 1133B in the desired position for the desired precision level while maneuvering the lower portion 1133A about a reference surface 22, with the ability to quickly change back and forth between the different precision levels.

In some examples, the first precision level comprises a fine precision level and the second precision level comprises a coarse precision level, or vice versa.

In some examples, the different precision levels implemented via input device 830 may comprise substantially the same attributes (e.g. substantially different, greater, lesser, etc.) as previously described in association with at least FIGS. 1-5B.

Figure 15C:
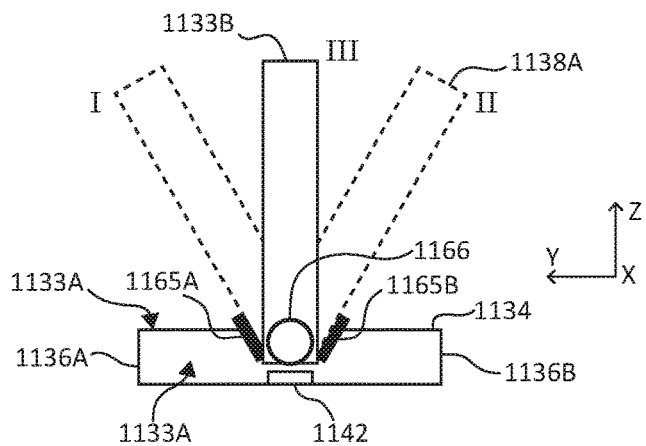

In some examples, the input device 1130 may comprise intermediate operable positions, such as shown in FIG. 15C in which a third position III is interposed between the first position I and second position II. Via such an arrangement, the portion 1133B may be used to select operation in three different precision levels.

FIGS. 16A-16B are each a top view schematically representing an example input device 1230. In some examples, input device 1230 comprises at least some of substantially the same features as the input devices as previously described in association with at least FIGS. 1-15B, except for comprising a shape-shiftable housing 1232, among other differences. In some examples, like other previously described input devices, housing 1232 of input device 1230 comprises a front portion 1235A and opposite back portion 1235B, as well as opposite sides 1236A, 1236B. In some examples, input device 1230 comprises input buttons 1262A, 1262B. The housing 1232 also comprises a top portion 1234 and opposite bottom contact portion 1244 for releasable slidable contact against a reference surface 22. In addition, housing 1232 may comprise a first portion 1250A and a second portion 1250B with the respective first and second portions 1250A, 1250B being movable relative to each other to provide shape-shifting properties of housing 1232.

As represented via dashed lines 1242, the input device 1230 comprises a sensor 1242 on bottom contact portion 1244 to detect movement of input device 1230 relative to a reference surface 22, such as when positioning a cursor 62 on a display 60 (FIG. 1).

In some examples, the housing 1232 of the input device 1230 may be in a first configuration, such the first portion 1250A being in a first position relative to the second portion 1250B such as shown in FIG. 16A. The housing 1232 may be manipulated into a second configuration, such as first portion 1250A being in a second position relative to the second portion 1250B as shown in FIG. 16B.

In some examples, the housing 1232 may be biased in one of the first position (FIG. 16A) or second position (FIG. 16B), such that in absence of active manipulation by the user, the housing 1232 will return to its original position (e.g. the first or second position). However, in some examples, the housing 1232 is not biased in one of the first or second positions, but instead may comprise a resilient material or elements by which the housing may tend to stay in a given position (e.g. the first position or second position), until or unless the user actively manipulates the housing 1232 into the other position (e.g. first or second position).

In some examples, when in the first position shown in FIG. 16A, sensor 1242 operates at a first precision level and when in the second position shown in FIG. 16B, sensor 1242 operates at a different, second precision level.

In some examples, the different precision levels implemented via input device 1230 may comprise substantially the same attributes (e.g. substantially different, greater, lesser, etc.) as previously described in association with at least FIGS. 1-5B.

In some examples, the input device 1230 comprises a second sensor 1233 to detect relative movement and/or a relative position of a first portion 1250A of housing 1232 relative to second portion 1250B of housing 1232. In some such examples, the second sensor 1233 may be located at an interface 1251 of the respective first and second portions 1250A, 1250B as shown in FIGS. 16A-16B. However, in some examples the second sensor 1233 may be located elsewhere on input device 1230, and may have a different configuration if desired.

In some examples, the housing 1232 of input device 1230 may be manipulated into more than two different positions to cause operation of sensor 1233 at more than two different precision levels.

In some examples, at least one feature of at least one example input device as previously described in association with FIGS. 1-16B may be combined with at least one feature of other example input device as previously described in association with FIGS. 1-16B.

In at least some examples, the change between precision levels triggered by overcoming a force of a spring, such as in at least some of the examples associated with at least FIGS. 11A-11C, 12A-12D, etc., is not in proportion to the amount of force used to overcome the biasing action of the spring. Accordingly, in such instances, the different precision levels may be considered to be a binary change and not determined according to the degree of force used to overcome a biasing force associated with different positions of a housing an example input device.

FIG. 17A is a block diagram schematically representing an example control portion 1300. In some examples, control portion 1300 provides one example implementation of the control portion 250 (FIG. 2A-2B) and/or a control portion forming a part of, implementing, and/or managing any one of the input devices, components (e.g. sensor, input buttons, etc.), instructions, engines, functions, and/or methods, as described throughout examples of the present disclosure in association with FIGS. 1-16B and 18-20.

In some examples, control portion 1300 includes a controller 1302 and a memory 1310. In general terms, controller 1302 of control portion 1300 comprises at least one processor 1304 and associated memories. The controller 1302 is electrically couplable to, and in communication with, memory 1310 to generate control signals to direct operation of at least some the input devices, components (e.g. sensor, input buttons, etc.), instructions, engines, functions, and/or methods, as described throughout examples of the present disclosure. In some examples, these generated control signals include, but are not limited to, employing instructions 1311 stored in memory 1310 to operate an input device in the manner described in at least some examples of the present disclosure. In some examples, at least some instructions 1311 are implemented via manufacturing engine 1350 in FIG. 18.

In response to or based upon commands received via a user interface (e.g. user interface 1320 in FIG. 17B) and/or via machine readable instructions, controller 1302 generates control signals to implement cursor control in accordance with at least some of the examples of the present disclosure. In some examples, at least a portion of controller 1302 is embodied in a general purpose computing device while in some examples, at least a portion of controller 1302 is incorporated into or associated with at least some of the devices, components (e.g. sensor, input buttons, etc.), instructions, engines, functions, and/or methods, etc. as described throughout examples of the present disclosure.

For purposes of this application, in reference to the controller 1302, the term "processor" shall mean a presently developed or future developed processor (or processing resources) that executes sequences of machine readable instructions contained in a memory. In some examples, execution of the sequences of machine readable instructions, such as those provided via memory 1310 of control portion 1300 cause the processor to perform actions, such as operating controller 1302 to implement cursor control as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory computer readable medium or non-volatile tangible medium), as represented by memory 1310. In some examples, memory 1310 comprises a computer readable tangible medium providing non-volatile storage of the machine readable instructions executable by a process of controller 1302. In other examples, hard wired circuitry may be used in place of or in combination with machine readable instructions to implement the functions described. For example, controller 1302 may be embodied as part of at least one application-specific integrated circuit (ASIC). In at least some examples, the controller 1302 is not limited to any specific combination of hardware circuitry and machine readable instructions, nor limited to any particular source for the machine readable instructions executed by the controller 1302.

In some examples, control portion 1300 may be entirely implemented within or by a stand-alone device, which has at least some of substantially the same features and attributes as one of the example input devices as previously described in association with at least FIGS. 1-16B. In some examples, the control portion 1300 may be partially implemented in such input devices and partially implemented in a computing resource separate from, and independent of, such input devices but in communication with the input device.

In some examples, control portion 1300 includes, and/or is in communication with, a user interface 1320 as shown in FIG. 17B. In some examples, user interface 1320 comprises a user interface or other display that provides for the simultaneous display, activation, and/or operation of at least some of the devices, components (e.g. sensor, input buttons, etc.), instructions, engines, functions, and/or methods, etc. as described in association with FIGS. 1-17A and 18-20. In some examples, at least some portions or aspects of the user interface 1320 are provided via a graphical user interface (GUI), and may comprise a display 1324 and input 1324. In some examples, user interface 1320 may comprise or be at least partially implemented via display 60 (FIG. 1).

FIG. 17C is a block diagram schematically representing an example system 1331. In some examples, system 1331 comprises an input device 1330, computing device 1332, and display 60. In some examples, input device 1330 may comprise at least some of substantially the same features of the various example input devices previously described in association with at least FIGS. 1-17B.

In some examples, input device 1330 is in communication with display 60 via computing device 1332, with computing device 1332 at least partially controlling cursor 62 on display 60 via information from input device 1330. The communication among input device 1330, computing device 1332, and display may be wired, wireless, or a combination of wired and wireless communication. In some examples, display 60 may be physically integrated with computing device 1332, such as in a laptop computer, computer tablet, desktop computer, and the like. However, in some examples, display 60 is physically separate from computing device 1332. In some examples, input device 1330 may be in communication with display 60 without employing computing device 1332.

In some examples, a control portion such as control portion 1300 (FIG. 17A) is at least partially implemented among input device 1330, computing device 1332, and/or display 60. In some examples, display 60 at least partially implements user interface 1320 (FIG. 17B).

Figure 18:
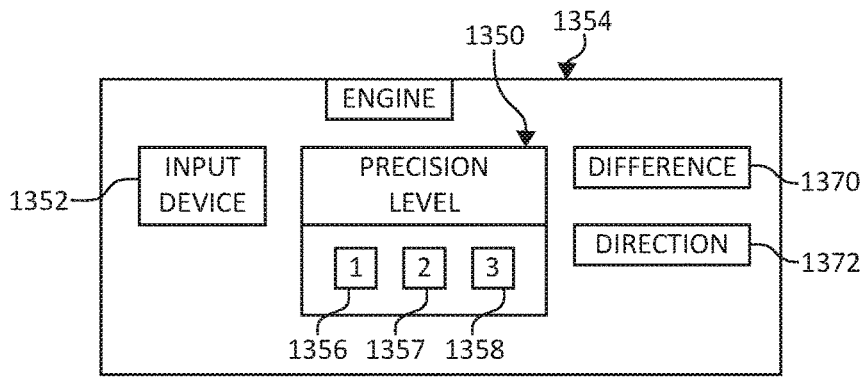
FIG. 18 is a block diagram schematically representing an example engine.

FIG. 18 is a block diagram schematically representing an example engine 1350. In some examples, the engine 1350 at least partially directs and manages a precision level of a cursor on a display. In some examples, engine 1350 may sometimes be referred to as a precision level engine or a cursor precision level engine. In some examples, engine 1350 provides an at least partial example implementation of instructions 1311 in memory 1310 associated with control portion 1300 (FIG. 17A). In some examples, engine 1350 provides one example by which at least some examples described in association with at least FIGS. 1-17C and 19-20 may be implemented.

As shown in FIG. 18, in some examples engine 1350 comprises an input device function 1352 to select or manage which type of input device and/or particular input device is being used to control a cursor on a display (e.g. 62 on 60 in FIG. 1). In some examples, engine 1350 comprises a precision level function 1354 to select a particular precision level, such as a first, second, or third precision level (1, 2, 3) 1356, 1357, 1358 by which a sensor or respective multiple sensors may operate depending on a position of respective portions of the input device, as previously described in association with at least FIGS. 1-16B. In some examples, engine 1350 comprises a difference function 1370 to set a difference between respective different precision levels, such as a first precision level and a second precision level, or among a first, second, and third precision levels. In some examples, engine 1350 comprises a direction function 1372 to control which direction of movement of a portion of an input device is associated with a particular precision level.

Figure 19:
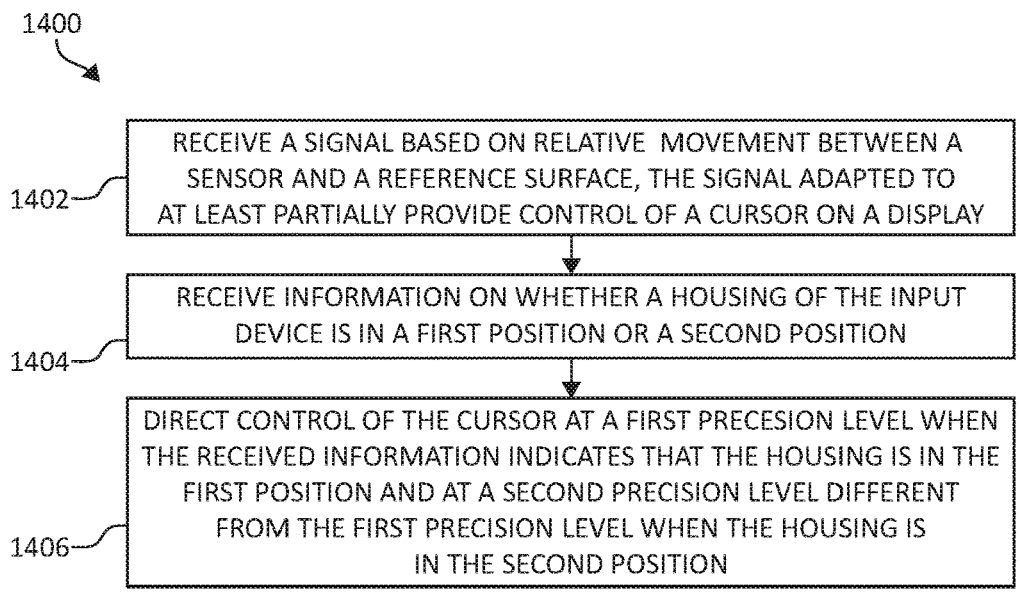
FIG. 19 is a flow diagram schematically representing an example method.

FIG. 19 is a flow diagram schematically representing an example method. In some examples, method 1400 may be performed via at least some of substantially the same features and attributes of the example input devices as previously described in association with FIGS. 1-17C. In some examples, method 1400 may be performed via at least some of substantially the same features and attributes other than those previously described in association with FIGS. 1-17C.

As shown at 1402 in FIG. 19, in some examples method 1400 comprises receiving a signal based on relative movement between a sensor and a reference surface, with the signal adapted to at least partially provide control of a cursor on a display. At 1404, in some examples method 1400 comprises receiving information on whether a housing of the input device is in a first position or a second position. At 1406, in some examples method 1400 comprises directing control of the cursor at a first precision level when the received information indicates that the housing is in the first position and at a second precision level different from the first precision level when the housing is in the second position.

Figure 20:
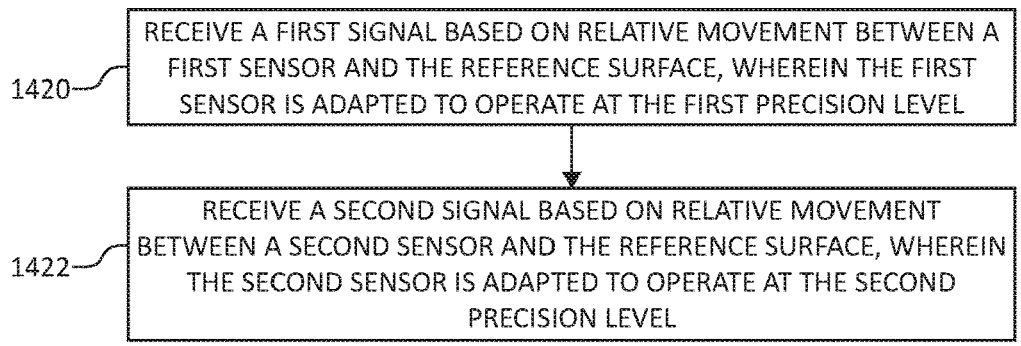
FIG. 20 is a flow diagram schematically representing an example method.

In some examples, at 1420 in FIG. 20, method 1400 further comprises receiving a first signal based on relative movement between a first sensor and the reference surface, wherein the first sensor is adapted to operate at the first precision level. At 1422, method 1400 further comprises receiving a second signal based on relative movement between a second sensor and the reference surface, wherein the second sensor is adapted to operate at the second precision level.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:
1. An input device comprising:
 a sensor adapted to provide cursor control on a display based on relative movement between the sensor and a reference surface; and
 a housing at least partially containing the sensor and adapted to be selectively manipulatable relative to the reference surface into:
  a first position to cause operation of the sensor to control the cursor at a first precision level; and a second position to cause operation of the sensor to control the cursor at a second precision level different from the first precision level,
wherein a magnitude of difference between the first precision level and the second precision level is selectable by a user.

2. The input device of claim 1, wherein a precision level difference between the first precision level and the second precision level comprises a difference of at least 10 percent.

3. The input device of claim 1, wherein the sensor comprises:
a first sensor for operation at the first precision level when the housing is in the first position; and
a second sensor for operation at the second precision level when the housing is in the second position.

4. The input device of claim 3, wherein the housing comprises:
a first contact portion at which the first sensor is located and extending in a first plane; and
a second contact portion at which the second sensor is located and extending in a second plane different from the first plane.

5. The input device of claim 4, wherein the first plane is generally parallel to the second plane, and wherein the first contact portion comprises a first face of the housing and the second contact portion comprises an opposite second face of the housing.

6. The input device of claim 4, wherein the first plane extends an obtuse angle relative to the second plane.

7. The input device of claim 3, wherein the sensor comprises a single sensor and at least a portion of the housing is rotatable relative to a first axis, wherein the housing is rotatable about the first axis into the respective first and second positions relative to the single sensor.

8. The input device of claim 7, wherein the first axis adapted to extend parallel to the reference surface and adapted to extend at least one of:
perpendicular to a longitudinal axis of forearm of a user; and
parallel to a longitudinal axis of forearm of a user.

9. The input device of claim 7, wherein the first axis is adapted to extend generally perpendicular to the reference surface and extend generally perpendicular to a longitudinal axis of the forearm.

10. The input device of claim 1, wherein the sensor comprises a single sensor and at least one portion of the housing is biased in a respective one of the first and second positions and movable into the other of the respective first and second positions.

11. The input device of claim 1, wherein the housing comprises a flexible, resilient body selectively manipulatable into a first shape to implement the first position and a different second shape to implement the second position.

12. An input device comprising:
a housing including a first contact portion and a second contact portion;
a first sensor located at the first contact portion and adapted to provide a first precision level of control of a cursor on a display; and
a second sensor located at the second contact portion and adapted to provide a second precision level of control of the cursor on the display, wherein the second precision level is different than the first precision level, a precision level difference between the first precision level and the second precision level comprises a difference of at least 10 percent, and
wherein the second contact portion is adapted to be movable relative to a reference surface separately, and independently from, the first contact portion.

13. The input device of claim 12, comprising a control portion comprising:
a processor; and
a non-transitory computer-readable medium storing instructions, executable via the processor, to:
receive a signal based on based on relative movement between the first sensor and a reference surface or between the second sensor and the reference surface, the signal adapted to at least partially provide control of the cursor on the display; and
receive information on whether a housing of the input device is in a first position or a second position; and
direct control of the cursor at a first precision level when the received information indicates that the housing is in the first position and at a second precision level different from the first precision level when the housing is in the second position.

14. An input device comprising:
a sensor; and
a housing at least partially enclosing the sensor and a control portion, wherein the control portion comprises:
a processor; and
a non-transitory computer-readable medium storing instructions, executable via the processor, to:
receive a signal based on relative movement between a sensor and a reference surface, the signal adapted to at least partially provide control of a cursor on a display; and
receive information on whether a first portion of a housing of the input device is in a first position or a second position relative to a second portion of the housing while the sensor remains in slidable position with respect to the reference surface; and
direct control of the cursor at a first precision level when the received information indicates that the first portion of the housing is in the first position and at a second precision level different than the first precision level when the first portion of the housing is in the second position.

15. The input device of claim 14, wherein the instructions to receive the signal based on relative movement between the sensor and the reference surface comprise instructions to:
receive a first signal based on relative movement between a first sensor and the reference surface, wherein the first sensor is adapted to operate at the first precision level; and
receive a second signal based on relative movement between a second sensor and the reference surface, wherein the second sensor is adapted to operate at the second precision level.

16. The input device of claim 14, wherein the first portion is a top portion and the second portion is a bottom portion, and the top portion is selectively movable relative to the bottom portion.

* * * * *